United States Patent
Takahashi et al.

(10) Patent No.: US 12,005,894 B2
(45) Date of Patent: Jun. 11, 2024

(54) VEHICLE PRE-COLLISION DETECTION AND RESPONSE DEVICE

(71) Applicant: DENSO CORPORATION, Kariya (JP)

(72) Inventors: Toru Takahashi, Kariya (JP); Kei Kamiya, Kariya (JP); Shogo Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 330 days.

(21) Appl. No.: 17/466,643

(22) Filed: Sep. 3, 2021

(65) Prior Publication Data
US 2021/0394754 A1 Dec. 23, 2021

Related U.S. Application Data

(63) Continuation of application No. PCT/JP2020/008752, filed on Mar. 2, 2020.

(30) Foreign Application Priority Data

Mar. 6, 2019 (JP) ................................. 2019-041044

(51) Int. Cl.
*B60W 30/095* (2012.01)
*B60T 7/12* (2006.01)
*B60W 50/14* (2020.01)

(52) U.S. Cl.
CPC ............ *B60W 30/0956* (2013.01); *B60T 7/12* (2013.01); *B60W 50/14* (2013.01);
(Continued)

(58) Field of Classification Search
CPC ............ B60W 30/0956; B60W 50/14; B60W 2552/53; B60W 2554/4041;
(Continued)

(56) References Cited

U.S. PATENT DOCUMENTS

| 8,538,674 B2 * | 9/2013 | Breuer | B60W 30/09 340/436 |
| 11,260,853 B2 * | 3/2022 | Kamiya | B60W 30/09 |

(Continued)

FOREIGN PATENT DOCUMENTS

| JP | 2008-247330 A | 10/2008 |
| JP | 2009-166764 A | 7/2009 |
| JP | 2016-085712 A | 5/2016 |

*Primary Examiner* — Jason Holloway
*Assistant Examiner* — Benjamin J Brosh
(74) *Attorney, Agent, or Firm* — MASCHOFF BRENNAN

(57) ABSTRACT

In a driving assistance device for performing a driving assistance process to avoid or mitigate a collision between an own vehicle, which is a vehicle carrying the driving assistance device, and an oncoming vehicle detected within a predefined region ahead of the own vehicle, an entry determiner is configured to determine whether one of the own vehicle and the oncoming vehicle is likely to enter a lane in which the other one is present. An actuation controller is configured to, in response to the entry determiner determining that each one of the own vehicle and the oncoming vehicle is unlikely to enter the lane of the other, restrict actuation of the driving assistance process, and in response to the entry determiner determining that any one of the own vehicle and the oncoming vehicle is likely to enter the lane of the other, not restrict actuation of the driving assistance process.

8 Claims, 5 Drawing Sheets

(52) U.S. Cl.
CPC . *B60W 2552/53* (2020.02); *B60W 2554/4041* (2020.02); *B60W 2554/4043* (2020.02); *B60W 2554/4044* (2020.02); *B60W 2554/801* (2020.02)

(58) Field of Classification Search
CPC . B60W 2554/4043; B60W 2554/4044; B60W 2554/801; B60W 30/095; B60W 2554/4042; B60T 7/12; B60T 2201/022; B60T 2201/024; B60T 7/22; G08G 1/16
See application file for complete search history.

(56) References Cited

U.S. PATENT DOCUMENTS

| | | | |
|---|---|---|---|
| 2010/0082251 A1* | 4/2010 | Kogure | B60T 8/17558 |
| | | | 701/301 |
| 2010/0191421 A1* | 7/2010 | Nilsson | B62D 15/025 |
| | | | 701/41 |
| 2013/0238192 A1* | 9/2013 | Breu | B62D 15/0265 |
| | | | 701/41 |
| 2015/0291158 A1* | 10/2015 | Okita | B62D 15/0265 |
| | | | 701/1 |
| 2015/0367854 A1* | 12/2015 | Ezoe | B60W 30/18163 |
| | | | 701/1 |
| 2018/0118203 A1 | 5/2018 | Minemura et al. | |
| 2018/0118205 A1 | 5/2018 | Minemura et al. | |
| 2018/0268696 A1* | 9/2018 | Morotomi | B60W 30/18163 |
| 2019/0001970 A1 | 1/2019 | Takahashi et al. | |

* cited by examiner

VEHICLE PRE-COLLISION DETECTION AND RESPONSE DEVICE

CROSS-REFERENCE TO RELATED APPLICATION

This application is based on and claims the benefit of priority from earlier Japanese Patent Application No. 2019-041044 filed Mar. 6, 2019, the description of which is incorporated herein by reference.

BACKGROUND

Technical Field

The present disclosure relates to a driving assistance device that performs a driving assistance process for avoiding or mitigating a collision between an own vehicle and an object.

Related Art

A driving assistance device is known that is configured to, in response to determining that an object around an own vehicle is likely to collide with the own vehicle, perform a driving assistance process to avoid or mitigate a collision with the object. Upon determining that a collision between the object and the own vehicle is likely to occur, the driving assistance device alerts a driver of the own vehicle or increases braking power of brakes as the driving assistance process. The own vehicle refers to a vehicle carrying the driving assistance device.

DESCRIPTION OF SPECIFIC EMBODIMENTS

Figure 1A:
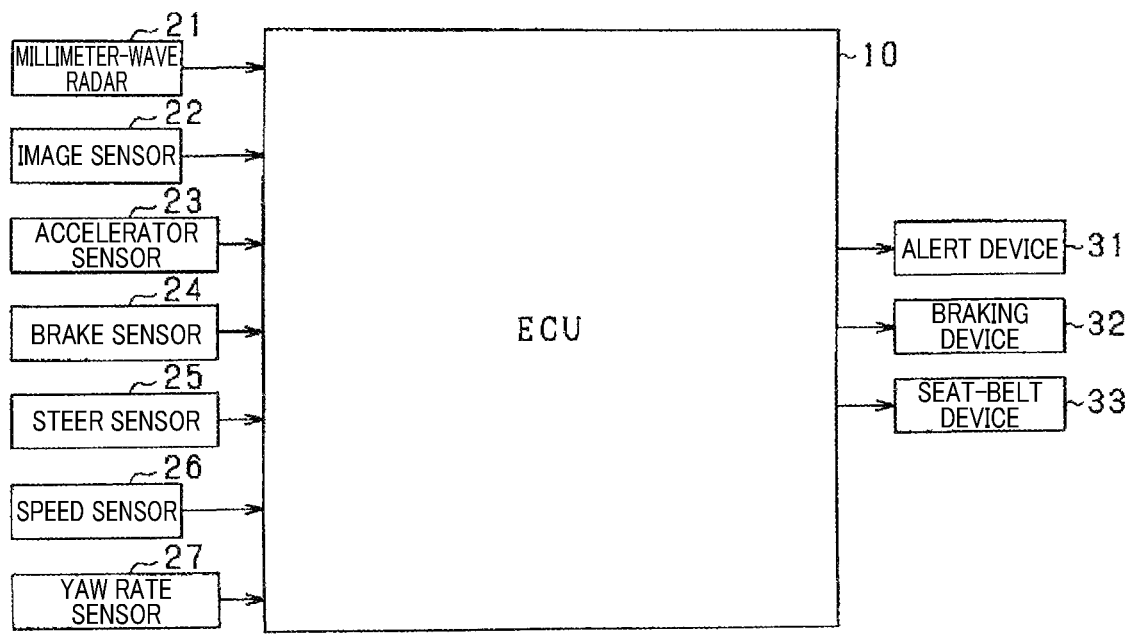
FIG. 1A is a block diagram of a driving assistance device.

In the above driving assistance process, as disclosed in JP-A-2017-114429, the timings of actuating respective devices are calculated according to a relative speed of the object to the own vehicle. Therefore, in a scenario where an oncoming vehicle traveling ahead of the own vehicle passes the own vehicle, the relative speed of the oncoming vehicle to the own vehicle becomes high, which may cause the driving assistance process to be unnecessarily actuated. However, if the driving assistance process is not performed for any oncoming vehicle due to a concern about unnecessary actuation of the driving assistance process for the oncoming vehicle, a dangerous situation for the own vehicle may occur depending on a path of the oncoming vehicle.

In view of the foregoing, it is desired to have a driving assistance device that can properly perform a driving assistance process on an own vehicle for an oncoming vehicle.

One aspect of the present disclosure provides a driving assistance device for performing a driving assistance process to avoid or mitigate a collision between an own vehicle, which is a vehicle carrying the driving assistance device, and a vehicle detected within a predefined region ahead of the own vehicle. In the driving assistance device, an oncoming vehicle determiner is configured to determine the vehicle traveling in an opposite direction from a direction of travel of the own vehicle as an oncoming vehicle. An entry determiner is configured to determine whether one of the own vehicle and the oncoming vehicle is likely to enter a lane in which the other of the own vehicle and the oncoming vehicle is present. An actuation controller is configured to, in response to the entry determiner determining that each one of the own vehicle and the oncoming vehicle is unlikely to enter the lane of the other, restrict actuation of the driving assistance process, and in response to the entry determiner determining that any one of the own vehicle and the oncoming vehicle is likely to enter the lane of the other, not restrict actuation of the driving assistance process.

As above, it is determined whether one of the own vehicle and the oncoming vehicle is likely to enter a lane in which the other of the own vehicle and the oncoming vehicle is present. In a situation where each one of the own vehicle and the oncoming vehicle is unlikely to enter the lane of the other, suppression of unnecessary actuation of the driving assistance process is prioritized by restricting actuation of the driving assistance process. In a situation where any one of the own vehicle and the oncoming vehicle is likely to enter the lane of the other, actuation of the driving assistance process is not restricted. With this configuration, a determination as to whether to restrict or not restrict actuation of the driving assistance process is made according to the risk of a path of the oncoming vehicle for the own vehicle, thereby enabling appropriate implementation of the driving assistance process in situations where there is an oncoming vehicle ahead of the own vehicle.

First Embodiment

A driving assistance device according to a first embodiment will now be described with reference to the accompanying drawings. The driving assistance device according to the present embodiment is mounted to a vehicle. In response to determining that a collision between the own vehicle and an object located in a predefined region ahead of the own vehicle is likely to occur, the driving assistance device performs pre-crash safety (PCS) control of the own vehicle to avoid or mitigate the collision between the own vehicle and the object. In the present embodiment, the PCS control corresponds to a driving assistance process.

Figure 1B:
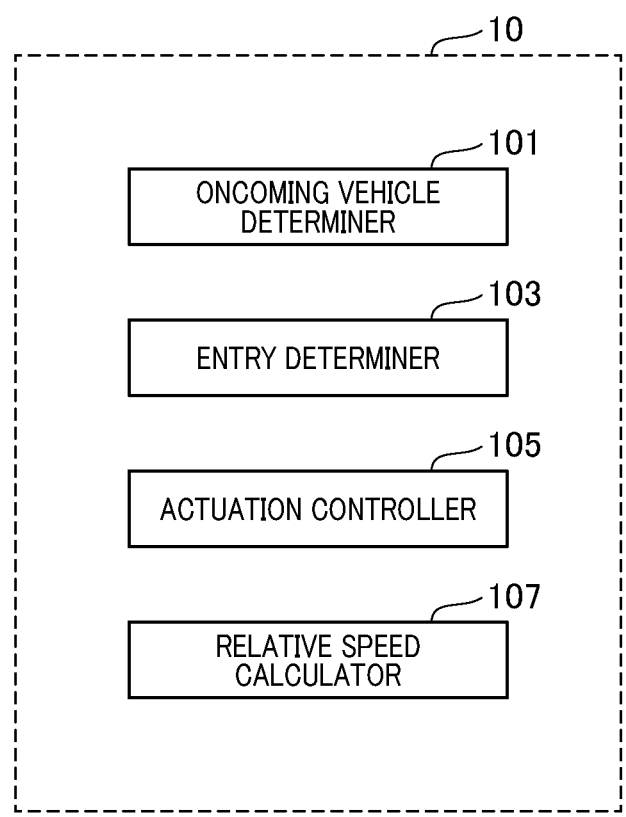
FIG. 1B is a functional block diagram of the driving assistance device.

In FIG. 1A, an electronic control unit (ECU) 10, which is a driving assistance device, is a computer or microcomputer including a central processing unit (CPU), a read-only memory (ROM), a random-access memory (RAM), an I/O interface, and the like. As illustrated in FIG. 1B, the ECU 10 includes, as functional blocks, an oncoming vehicle determiner 101, an entry determiner 103, an actuation controller 105, and a relative speed calculator 107. Each of these functional blocks of the ECU 10 is implemented by the CPU executing a program installed in the ROM.

A millimeter-wave radar 21 and an image sensor 22 are connected to the ECU 10 as sensor devices for detecting a position of an object located ahead of the vehicle.

The millimeter-wave radar 21, for example, transmits a high-frequency signal in the millimeter-wave band and receives a reflected wave of the millimeter wave from an object present around the own vehicle, thereby detecting a position of the object as a first position. The millimeter-wave radar 21 is provided at the front end of the own vehicle. A region within a predefined sensing angle is a detection region where objects can be detected.

The image sensor 22 includes an imager that captures an image in a forward direction of the own vehicle and detects a position of an object included in the acquired image as a second position. The image sensor 22 is mounted at a predefined height in the lateral (or widthwise) center of the own vehicle and acquires a captured image of a region ahead of the own vehicle, encompassing a predefined angular range. For example, the image sensor 22 extracts feature points of an object in the captured image and detects a position and a shape of the object using the extracted feature points. The imager may be a monocular camera or a stereo camera.

Various sensors 23 to 27 for detecting a driving state of the own vehicle are connected to the ECU 10. An accelerator sensor 23 is provided on an accelerator pedal and detects whether the accelerator pedal is operated by the driver and an amount of operation thereof. The brake sensor 24 is provided on a brake pedal and detects whether the brake pedal is operated by the driver and an amount of operation thereof. A steer sensor 25 detects a steering amount θ associated with an operation of the steering wheel by the driver. A speed sensor 26 detects a speed Vc of the own vehicle based on a rotation speed of the wheels. A yaw rate sensor 27 detects a yaw rate ψ indicating a change in direction over time when the own vehicle turns.

An alert device 31, a braking device 32, and a seat-belt device 33 are connected to the ECU 10. The alert device 31 is a speaker or a display installed in a vehicle cabin and outputs an alert sound, an alert message or the like in response to a control command from the ECU 10. The braking device 32 applies braking power to the own vehicle. The seat-belt device 33 is a pretensioner for retracting a seat belt provided in each seat of the own vehicle.

Each function of the ECU 10 will now be described. The ECU 10 acquires an object position P(i) that is a position of an object around the own vehicle, based on results of detection by the millimeter-wave radar 21 and the image sensor 22. In the present embodiment, in cases where a second position of an object detected by the image sensor 22 is in the vicinity of a first position of an object detected by the millimeter-wave radar 21, the ECU 10 deems the object detected by the image sensor 22 and the object detected by the millimeter-wave radar 21 to be the same object and associates the first position of the object detected by the millimeter-wave radar 21 and the second position of the object detected by the image sensor 22 with each other. In such cases, it is likely that an object is actually present at the first position. A state of an object in which the millimeter-wave radar 21 and the image sensor 22 can accurately determine the position of the object is referred to as a fusion state. For an object determined to be in the fusion state, the ECU 10 acquires a new object position P(i) of the object by fusing accurate information included in the first position with accurate information included in the second position.

For each object having the object position P(i) acquired, the ECU 10 calculates a relative position and a relative speed of the object to the own vehicle. In the present embodiment, the relative speed of the object to the own vehicle is positive if the direction of the relative speed of the object is opposite from the direction of travel of the own vehicle. In the present embodiment, the ECU 10 functions as the relative speed calculator 107 (illustrated in FIG. 1B) that is responsible for execution of step S17 described later.

The ECU 10 determines whether a collision between the own vehicle and the object is likely to occur, based on a path or course of the object and the position of the own vehicle. In the present embodiment, the ECU 10 calculates the path of the object based on changes in the object position P(i). If the calculated path of the object intersects with a virtual actuation region set ahead of the own vehicle, the ECU 10 determines that the own vehicle and the object are likely to collide. The actuation region is, for example, a smaller region than each of the detection regions of the millimeter-wave radar 21 and the image sensor 22. In an alternative embodiment, the ECU 10 may calculate a path of the own vehicle based on the yaw rate ψ and the speed Vc of the own vehicle and determine that the own vehicle and the object are likely to collide if the calculated path of the own vehicle and the path of the object intersect.

Figure 2:
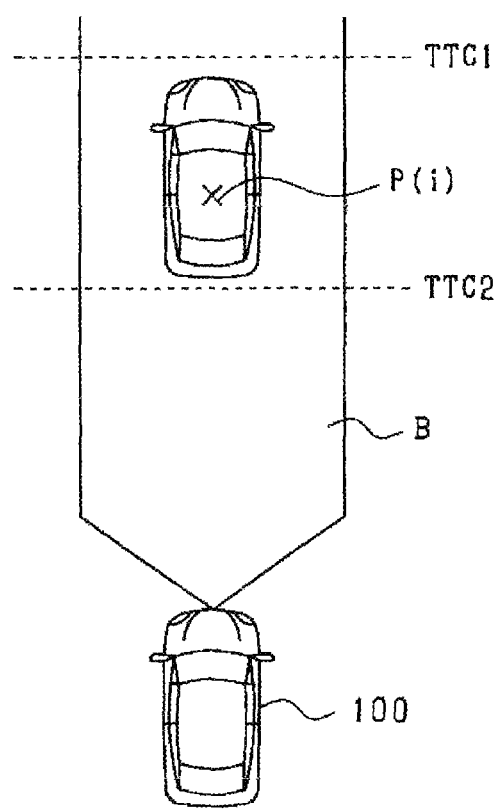
FIG. 2 is an illustration of an actuation region set ahead of an own vehicle.

In response to determining that a collision between the own vehicle and the object is likely to occur, the ECU 10 determines whether to actuate the respective devices 31-33. More specifically, as illustrated in FIG. 2, when the object position P(i) of the object determined to be likely to collide with the own vehicle 100 is located in the actuation region B ahead of the own vehicle and an expected amount of time to collision (hereinafter referred to as a time to collision (TTC)) has reached the actuation timing associated with a certain one of the devices 31-33, the ECU 10 actuates the certain one of the devices 31-33.

The TTC is an expected amount of time to collision between the own vehicle 100 and the object. In the present embodiment, the TTC is calculated by dividing a distance between the own vehicle 100 and the object by the relative speed of the object to the own vehicle 100. The actuation timings are timings at which the respective devices 31-33 are actuated. The TTC at which the device having an earlier actuation timing, among the devices 31-33, is actuated is greater than the TIC at which the device having a later actuation timing, among the devices 31-33, is actuated.

The actuation timing is set to vary with the alert device 31, the braking device 32, and the seat-belt device 33. In the present embodiment, among the actuation timings of the respective devices 31-33, the actuation timing TTC1 of the alert device 31 is set to the earliest timing.

The TTC decreases as the object determined to collide with the own vehicle 100 approaches the own vehicle 100. When the TTC becomes equal to or less than the actuation timing TTC1 of the alert device 31, the ECU 10 actuates the alert device 31. The alert device 31 notifies the driver of the risk of collision.

After the actuation timing TTC1 of the alert device 31, the ECU 10 actuates the braking device 32 when the TTC becomes equal to or less than the actuation timing TTC2 of the braking device 32. The actuation of the braking device 32 by the ECU 10 includes automatic braking to actuate the braking device 32 without the driver depressing the brake pedal, and brake-assistance, in which the braking power applied by the braking device 32 is increased while the driver is depressing the brake pedal, where the actuation timing of the brake-assistance and the actuation timing of the automatic brake may be different from or equal to each other.

In the present embodiment, the actuation timing of the seat-belt device 33 is set equal to the actuation timing TTC2 of the braking device 32. For example, upon actuation of the braking device 32, a preliminary operation of seat belt retraction by the seat-belt device 33 is carried out.

By the way, in a scenario where an oncoming vehicle traveling ahead of the own vehicle passes the own vehicle, the relative speed of the oncoming vehicle to the own vehicle becomes high, which may cause the PCS control to be unnecessarily actuated. There is also a concern that detection errors of the millimeter wave radar 21 and the image sensor 22 may increase due to the distance between the vehicle and the oncoming vehicle, or that the path of the own vehicle or the oncoming vehicle may change after the oncoming vehicle is detected. However, if the PCS control is not performed for any oncoming vehicle due to a concern about unnecessary actuation of the PCS control for the oncoming vehicle, a dangerous situation for the own vehicle may occur depending on a path of the oncoming vehicle.

In a situation where there is an oncoming vehicle ahead of the own vehicle, the ECU 10 restricts actuation of the PCS control in cases where the oncoming vehicle is unlikely to enter the path of the own vehicle, and does not restrict actuation of the PCS control in cases where the oncoming vehicle is likely to enter the path of the own vehicle.

The ECU 10 determines, among objects ahead of the own vehicle, a vehicle traveling in the opposite direction from the direction of travel of the own vehicle as an oncoming vehicle. In the present embodiment, the ECU 10 determines a vehicle traveling in the opposite direction from the direction of travel of the own vehicle in a lane adjacent to the lane in which the own vehicle is traveling as an oncoming vehicle. More specifically, the ECU 10 detects, as an oncoming vehicle, a vehicle detected in the adjacent oncoming lane, whose relative distance to the own vehicle is decreasing. In the following, the lane in which the own vehicle is traveling is referred to as an own lane. In the present embodiment, the ECU 10 functions as the oncoming vehicle determiner 101 (illustrated in FIG. 1B) that is responsible for execution of step S13 described later.

Figure 3:
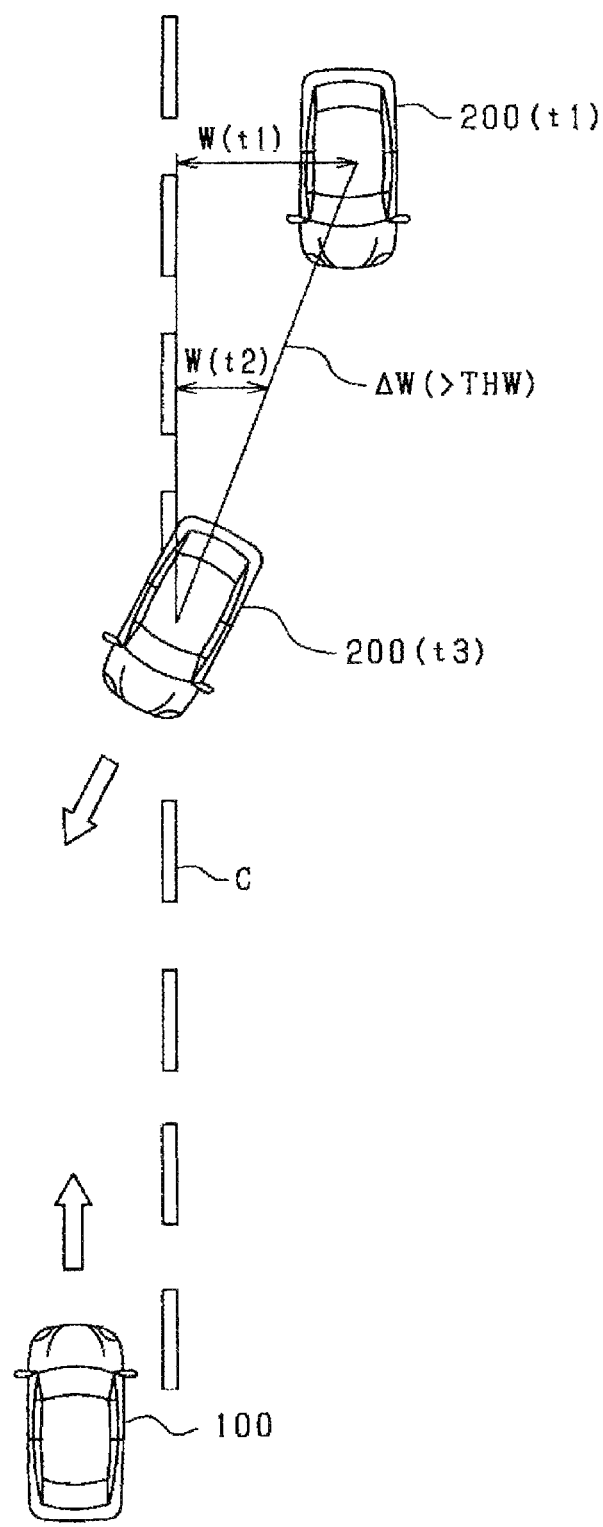
FIG. 3 is an illustration of an oncoming vehicle entering an own lane.

Based on the path of the own vehicle and changes in the position of the oncoming vehicle, the ECU 10 determines whether the oncoming vehicle is likely to enter the own lane from the oncoming lane. In the present embodiment, FIG. 3 illustrates a scenario where an oncoming vehicle 200 ahead of the own vehicle is going to enter the own lane from the oncoming lane as it proceeds from time t1 to t3. As illustrated in FIG. 3, the ECU 10 determines that the oncoming vehicle 200 is likely to enter the own lane when a lateral distance W from a lane line C that demarcates a border between the own lane and the oncoming lane to the oncoming vehicle 200 is decreasing and a rate of decrease of the lateral distance W is greater than a predefined decrease rate threshold THW. In FIG. 3, the oncoming vehicle 200 is traveling while approaching the lane line C, and the lateral distance W(t2) of the oncoming vehicle 200 at time t2 is less than the lateral distance W(t1) of the oncoming vehicle 200 at time t1. A slope ΔW indicating the rate of decrease of the lateral distance W is greater than the decrease rate threshold THW. Therefore, it can be determined that the oncoming vehicle 200 is likely to enter the own lane. In the following, the determination as to whether the oncoming vehicle is likely to enter the own lane is referred to as lane departure determination. In the present embodiment, the ECU 10 functions as the entry determiner 103 (illustrated in FIG. 1B) that is responsible for execution of steps S15-S16 described later.

When the ECU 10 determines that the oncoming vehicle is likely to enter the own lane in the lane departure determination, the ECU 10 does not restrict actuation of the PCS control. On the other hand, when the ECU 10 determines that the oncoming vehicle is unlikely to enter the own lane in the lane departure determination, the ECU 10 restricts actuation of the PCS control. More specifically, as a restriction on actuation of the PCS control, the ECU 10 narrows the actuation region B that defines a position-of-object condition for actuating the respective devices 31-33, and delays the actuation timings of the respective devices 31-33. In the present embodiment, The ECU 10 functions as the actuation controller 105 (illustrated in FIG. 1B) that is responsible for execution of step S18 described later.

Figure 4A:
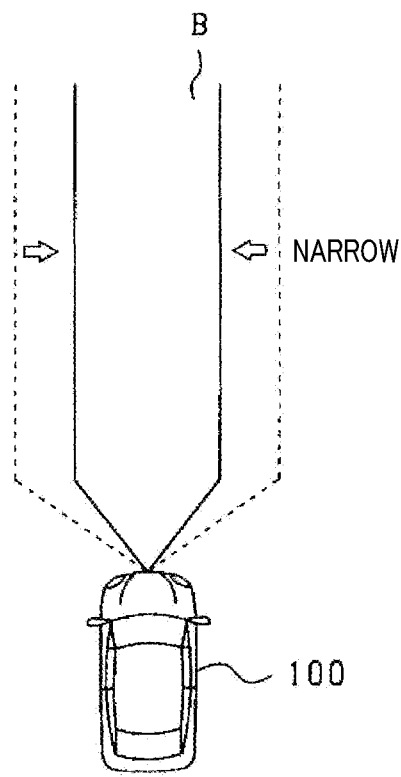
FIGS. 4A and 4B are an illustration of restricting actuation of PCS control.

As illustrated in FIG. 4A, when the ECU 10 restricts actuation of the PCS control, the ECU 10 narrows the actuation region B in a lateral direction with respect to the lateral center of the own vehicle 100. When the actuation region B is narrowed, the number of oncoming vehicles ahead of the own vehicle, subject to the actuation condition for actuating the respective devices 31-33, is limited as compared to when the actuation region B is not narrowed, which makes it difficult to actuate the respective devices 31-33.

Figure 4B:
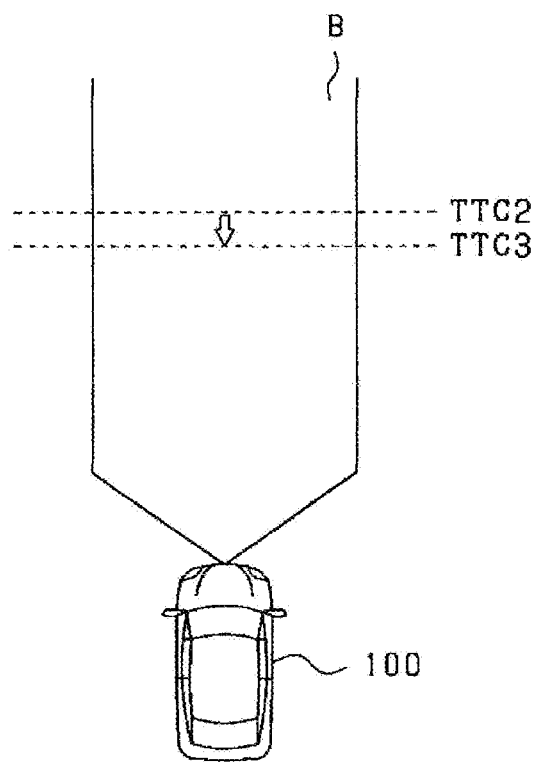

As illustrated in FIG. 4B, when the ECU 10 restricts actuation of the PCS control, the ECU 10 delays the actuation timings of the respective devices 31-33 relative to the actuation timings of the respective devices 31-33 when actuation of the PCS control is not restricted. In the example of FIG. 4B, the actuation timing of the braking device 32 is delayed from TTC2 to TTC3. Delaying the actuation timings of the respective devices 31-33 makes it difficult to actuate the respective devices 31-33.

The ECU 10 may be configured to not delay the actuation timings of the respective devices 31-33 after initiating actuation of the devices 31-33. This is to prevent actuation of the devices from being suspended due to changes in the actuation timings after actuation of the devices 31-33 is initiated.

Figure 5:
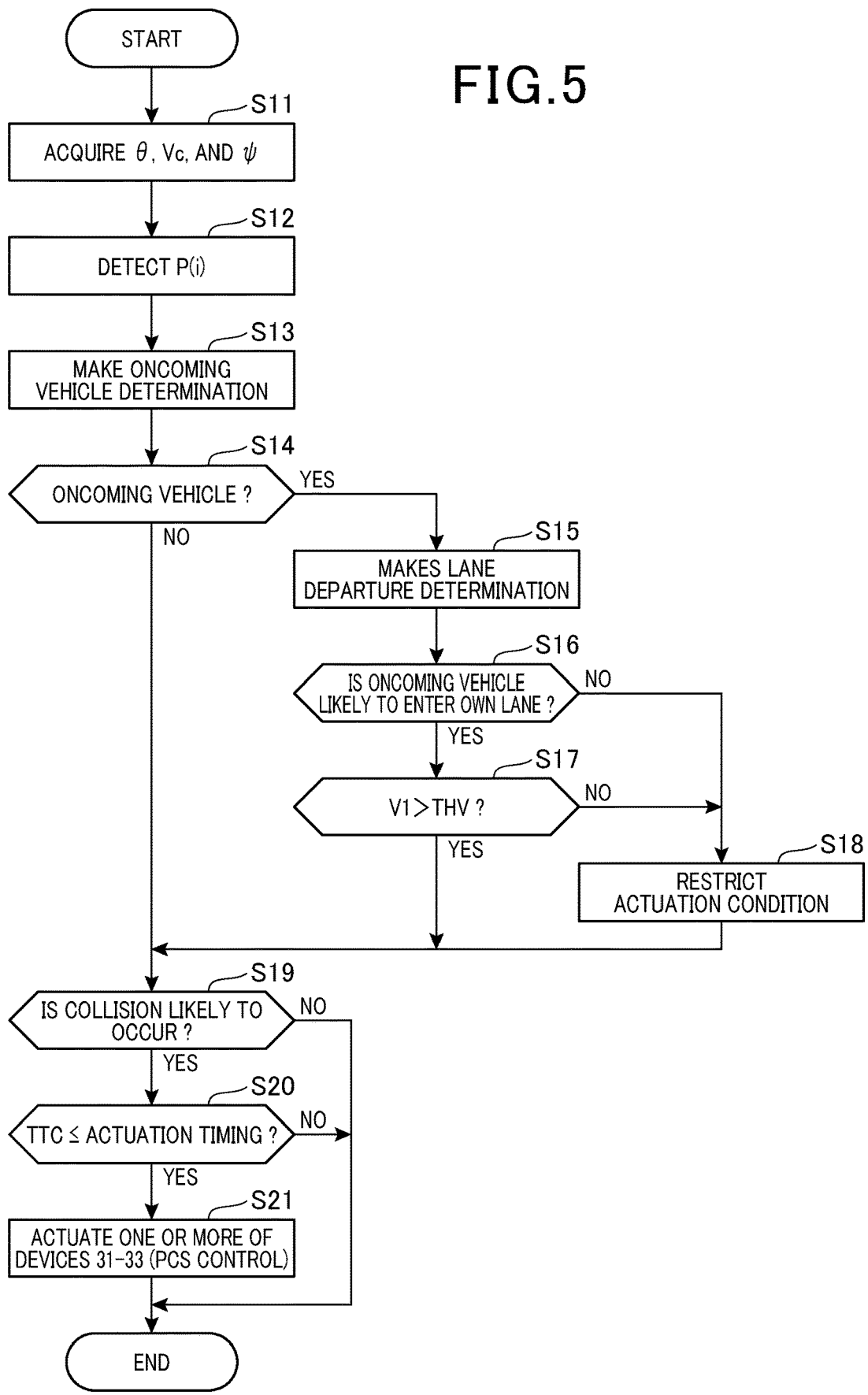
FIG. 5 is a flowchart illustrating process steps of the PCS control.

Process steps of the PCS control will now be described with reference to the flowchart of FIG. 5. The process of FIG. 5 is repeatedly performed by the ECU 10 every predefined control cycle.

At step S11, the ECU 10 acquires an amount of steering θ acquired by the steer sensor 25, an own vehicle speed Vc detected by the speed sensor 26, and a yaw rate ψ detected by the yaw rate sensor 27.

At step S12, the ECU 10 detects object positions P(i) that are positions of respective objects ahead of the own vehicle. At step S13, the ECU 10 determines, among the objects having the object position P(i) detected at step S12, an object corresponding to an oncoming vehicle.

If, at step S13 of oncoming vehicle determination, the ECU 10 determines that there is no object corresponding to an oncoming vehicle, the answer is NO at step S14. The ECU 10 then proceeds to step S19. At step S19, for each object having the object position P(i) detected, the ECU 10 determines whether the path of the object intersects the actuation region B set ahead of the own vehicle, thereby determining whether a collision between the own vehicle and the object is likely to occur. If the path of the object does not intersect the actuation region B, the answer is NO at step S19. The ECU 10 then terminates this iteration of the process of FIG. 5.

If the path of the object intersects the actuation region B, the answer is YES at step S19 and then the ECU 10 proceeds to step S20. At step S20, the ECU 10 determines whether the current TTC has passed the actuation timing of any of the devices 31-33. If the ECU 10 determines that the current TTC has not passed the actuating timing of any of the devices 31-33, the ECU 10 terminates this iteration of the process of FIG. 5.

If at step S20 the ECU 10 determines that the current TTC has passed the actuating timing of any of the devices 31-33, the ECU 10 proceeds to step S21. At step S21, the ECU 10 performs the PCS control by actuating those devices, of the devices 31-33, whose actuation timing is reached. Then, the ECU 10 terminates this iteration of the process of FIG. 5.

If at step S14 the ECU 10 determines that an object ahead of the own vehicle, among the objects having the object position P(i) detected at step S12, is an oncoming vehicle, the ECU 10 proceeds to step S15. At step S15, the ECU 10 makes a lane departure determination for the oncoming vehicle. If the ECU 10 determines that the oncoming vehicle is unlikely to enter the own lane, the answer is NO at step S16 and then the ECU 10 proceeds to step S18. If the answer is NO at step S16, then at step S18 the ECU 10 restricts the actuation condition for the PCS control. More specifically, as described with reference to FIG. 4A, the ECU 10 narrows the actuation region B in the lateral direction and thereby delays the actuation timings of the respective devices 31-33.

If, at step S15 of the lane departure determination, the ECU 10 determines that the oncoming vehicle is likely to enter the own lane, the answer is YES at step S16 and then the ECU 10 proceeds to step S17. When the relative speed of the oncoming vehicle to the own vehicle is low, the driver has room to perform collision avoidance operations of the own vehicle even when the oncoming vehicle enters the own lane. In addition, in a situation where the oncoming vehicle makes a right or left turn at an intersection, the relative speed of the oncoming vehicle to the own vehicle is low. In such a case, it is better to leave the operations of the own vehicle to the driver, which can suitably suppress unnecessary actuation of the PCS control. Therefore, at step S17, it is determined whether the relative speed V1 of the oncoming vehicle is higher than a speed threshold THV.

If at step S17 the ECU 10 determines that the relative speed V1 of the oncoming vehicle to the own vehicle is equal to or lower than the speed threshold THV, the ECU 10 proceeds to step S18 to restrict actuation of the PCS control. For example, the speed threshold THV is an upper limit of the speed at which the driver of the own vehicle is allowed to perform collision avoidance operations in response to the oncoming vehicle entering the own lane.

At step S19 subsequent to step S18, the ECU 10 determines whether the oncoming vehicle has entered the actuation region B that has been laterally narrowed at step S18. If the answer is YES at step S19, then at step S20 the ECU 10 determines whether the current TTC has passed the actuation timing delayed at step S18. If the answer is YES at step S20, then the ECU 10 proceeds to step S21. At step S21, the ECU 10 performs the PCS control by actuating those devices, of the devices 31 to 33, whose actuation timing is reached. Thereafter, the ECU 10 terminates this iteration of the process of FIG. 5.

If at step S17 the ECU 10 determines that the relative speed V1 of the oncoming vehicle to the own vehicle is higher than the speed threshold THV, the ECU 10 proceeds to step S19 without restricting actuation of the PCS control. This is because the oncoming vehicle is likely to enter the own lane and thus collide with the own vehicle. Thus, the ECU 10 proceeds to step S19 without restricting actuation of the PCS control.

As described above, the present embodiment can provide the following advantages.

(A1) The ECU 10 determines whether an oncoming vehicle is likely to enter the own lane, based on the path of the own vehicle and the path of the oncoming vehicle. The ECU 10 restricts actuation of the PCS control in situations where the oncoming vehicle is unlikely to enter the own lane, and does not restrict actuation of the PCS control in situations where the oncoming vehicle is likely to enter the own lane. With this configuration, a determination as to whether to restrict or not restrict actuation of the PCS control is made according to the risk of the path of the oncoming vehicle for the own vehicle, thereby enabling appropriate implementation of the PCS control in situations where there is an oncoming vehicle ahead of the own vehicle.

(A2) In situations where the own lane and the oncoming lane are demarcated by a lane line or the like, the speed of the own vehicle or the oncoming vehicle is likely to be high. In such situations, the oncoming vehicle may enter the own lane. The ECU 10 determines a vehicle traveling in the opposite direction from the direction of travel of the own vehicle in a lane adjacent to the own lane as an oncoming vehicle. In situations where the oncoming vehicle is likely to deviate from the oncoming lane and enter the own lane, this allows the PCS control to be appropriately actuated by not restricting actuation of the PCS control.

(A3) The ECU 10 determines that the oncoming vehicle is likely to enter the own lane when the lateral distance W from the oncoming vehicle to the lane line that demarcates a border between the own lane and the adjacent oncoming lane is decreasing and the rate of decrease of the lateral distance W is greater than the predefined decrease rate threshold THW. This enables prediction of a lane departure of the oncoming vehicle before the oncoming vehicle actually enters the own lane, and thus enables an earlier determination as to whether to restrict or not restrict actuation of the PCS control.

(A4) The ECU 10 restricts actuation of the PCS control in response to determining that the relative speed of the oncoming vehicle to the own vehicle is higher than the speed determination value THV and that the oncoming vehicle is likely to enter the own lane. This enables appropriate suppression of unnecessary actuation of the PCS control.

Modification to First Embodiment

The ECU 10 may be configured to not put any restriction on actuation of the PCS control in cases where, according to the path of the own vehicle, the own vehicle is likely to enter an adjacent oncoming lane from the own lane. In such cases, at step S15 of lane departure determination, the ECU 10 may determine that the own vehicle is likely to enter the adjacent oncoming lane from the own lane when a lateral distance W from the own vehicle to the lane line that demarcates a border between the own lane and the adjacent oncoming lane is decreasing and the rate of decrease ΔW of the lateral distance W is greater than the predefined decrease rate threshold THW. In the present embodiment described above, the same advantages as in the first embodiment can be achieved.

Other Embodiments (B1) In an alternative embodiment to the above-described embodiment, in situations where an oncoming vehicle is traveling ahead of the own vehicle, the ECU 10 may restrict actuation of the PCS control when the own vehicle and the oncoming vehicle continue straight ahead and are expected to collide later. In this alternative embodiment, the ECU 10 may, at step S15, determine whether an own vehicle width range defined by the width of the own vehicle and an oncoming-vehicle width range defined by the width of the oncoming vehicle laterally overlap. In response to determining that the own vehicle and the oncoming vehicle are likely to continue straight ahead after determining that the own vehicle width range and the oncoming-vehicle width range laterally overlap, the ECU 10 may determine that the answer is YES at step S16.

(B2) The oncoming vehicle is not limited to a vehicle traveling in a lane adjacent to the own lane, but may also be a vehicle traveling on a road which is so narrow that the own lane and the oncoming lane are not demarcated by a lane line. In such a case, it may be determined that the oncoming vehicle is likely to enter the path of the own vehicle when the oncoming vehicle is traveling while approaching the path of the own vehicle. Specifically, the ECU 10 calculates the path of the own vehicle based on the yaw rate y and the speed Vc of the own vehicle. When the object position P(i) of the oncoming vehicle is changing to approach the calculated path of the own vehicle, it may be determined that the oncoming vehicle is likely to enter the path of the own vehicle.

(B3) In an alternative embodiment to the above-described embodiment, regardless of the relative speed of the oncoming vehicle to the own vehicle, actuation of the PCS control may not be restricted when one of the own vehicle and the oncoming vehicle is likely to enter the path of the other. In this alternative embodiment, the process step S17 should be removed, such that if the answer is YES at step S16, the ECU 10 proceeds to step S19.

(B4) The driving assistance device is not limited to one provided with the millimeter-wave radar 21 and the image sensor 22, but may be provided with either the millimeter-wave radar 21 or the image sensor 22. In this alternative embodiment, the position of the object detected by the millimeter-wave radar 21 or the image sensor 22 may be used as the object position P(i). The driving assistance device may also be provided with a laser scanner instead of the millimeter-wave radar 21.

(B5) The driving assistance process is not limited to the PCS control.

(B6) In the above-described embodiments and modifications, the control apparatus and its method described in the present disclosure may be implemented by a dedicated computer including a processor and a memory programmed to execute one or more functions embodied by computer programs. Alternatively, the control apparatus and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

While the disclosure has been described in accordance with the embodiments, it is understood that the disclosure is not limited to such embodiments or structures. The disclosure also encompasses various modifications and variations within the scope of equivalence. Furthermore, various combinations and modes, as well as other combinations and modes including only one element, more or less, thereof, are also within the scope and idea of the disclosure.

What is claimed is:

1. A driving assistance device for performing a driving assistance process to avoid or mitigate a collision between an own vehicle, which is a vehicle carrying the driving assistance device, and a vehicle detected within a predefined region ahead of the own vehicle, comprising:
   a non-transitory memory storing one or more computer programs; and
   a processor executing the one or more computer programs to:
   determine the vehicle traveling in an opposite direction from a direction of travel of the own vehicle as an oncoming vehicle;
   determine whether one of the own vehicle and the oncoming vehicle is likely to enter a lane in which the other of the own vehicle and the oncoming vehicle is present;
   in response to determining that each one of the own vehicle and the oncoming vehicle is unlikely to enter the lane of the other, restrict actuation of the driving assistance process by narrowing a lateral width of the predefined region ahead of the own vehicle, and in response to determining that any one of the own vehicle and the oncoming vehicle is likely to enter the lane of the other, not restrict actuation of the driving assistance process by maintaining the lateral width of the predefined region ahead of the own vehicle;
   determine whether the oncoming vehicle has entered the predefined region; and
   control the own vehicle to mitigate collision between the own vehicle and the oncoming vehicle by actuating the driving assistance process based on the oncoming vehicle entering the predefined region.

2. The driving assistance device according to claim 1, wherein
   the processor further executes the one or more computer programs to determine the vehicle traveling in the opposite direction from the direction of travel of the own vehicle in an oncoming lane adjacent to an own lane in which the own vehicle is traveling, as the oncoming vehicle.

3. The driving assistance device according to claim 2, wherein
   the processor further executes the one or more computer programs to determine, in response to a lateral distance from one of the own vehicle and the oncoming vehicle to a lane line that demarcates a border between the own lane and the oncoming lane being decreasing and a rate of decrease of the lateral distance being greater than a predefined decrease rate threshold, that the one of the own vehicle and the oncoming vehicle is likely to enter the lane in which the other of the own vehicle and the oncoming vehicle is present.

4. The driving assistance device according to claim 1, wherein
   the processor further executes the one or more computer programs to calculate a relative speed of the oncoming vehicle to the own vehicle, and
   in response to the relative speed of the oncoming vehicle to the own vehicle being higher than a predefined threshold and in response to determining that one of the own vehicle and the oncoming vehicle is likely to enter the lane in which the other of the own vehicle and the oncoming vehicle is present, the processor further executes the one or more computer programs to not restrict actuation of the driving assistance process.

5. A method for performing a driving assistance process to avoid or mitigate a collision between an own vehicle and a vehicle detected within a predefined region ahead of the own vehicle, the method comprising:
determining the vehicle traveling in an opposite direction from a direction of travel of the own vehicle as an oncoming vehicle;
determining whether one of the own vehicle and the oncoming vehicle is likely to enter a lane in which the other of the own vehicle and the oncoming vehicle is present;
restricting actuation of the driving assistance process by narrowing a lateral width of the predefined region ahead of the own vehicle in response to determining that neither the own vehicle nor the oncoming vehicle is likely to enter the lane of the other;
determining whether the oncoming vehicle has entered the predefined region; and
controlling the own vehicle to mitigate collision between the own vehicle and the oncoming vehicle by actuating the driving assistance process based on the oncoming vehicle entering the predefined region.

6. The method according to claim 5, further comprising determining the vehicle traveling in the opposite direction from the direction of travel of the own vehicle in an oncoming lane adjacent to an own lane in which the own vehicle is traveling, as the oncoming vehicle.

7. The method according to claim 6, further comprising determining, in response to a lateral distance from one of the own vehicle and the oncoming vehicle to a lane line that demarcates a border between the own lane and the oncoming lane being decreasing and a rate of decrease of the lateral distance being greater than a predefined decrease rate threshold, that the one of the own vehicle and the oncoming vehicle is likely to enter the lane in which the other of the own vehicle and the oncoming vehicle is present.

8. The method according to claim 5, further comprising:
calculating a relative speed of the oncoming vehicle to the own vehicle; and
in response to the relative speed of the oncoming vehicle to the own vehicle being higher than a predefined threshold and in response to determining that one of the own vehicle and the oncoming vehicle is likely to enter the lane in which the other of the own vehicle and the oncoming vehicle is present, not restricting actuation of the driving assistance process.

\* \* \* \* \*